Figure 1:
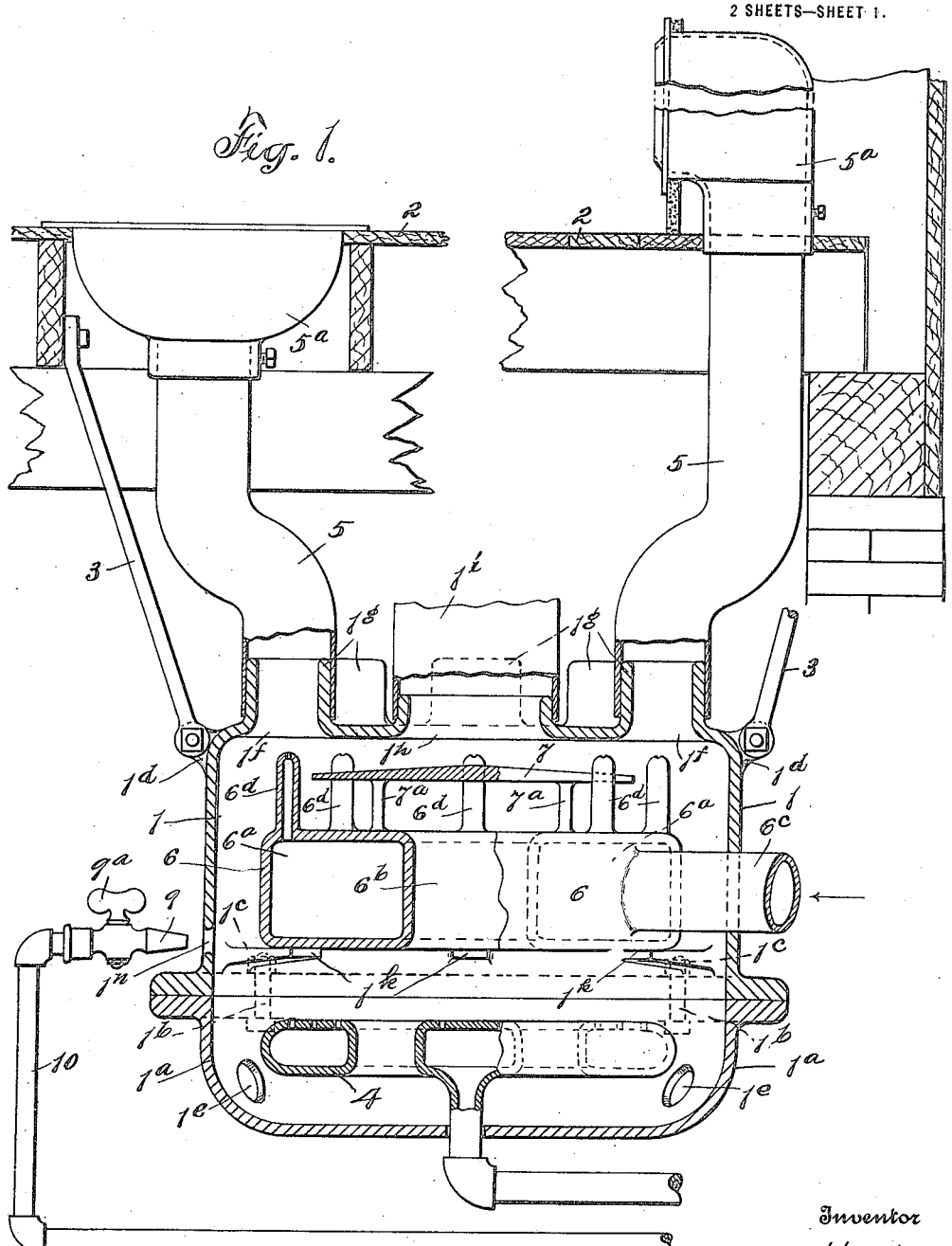

T. A. HOLMBERG.
HEATING SYSTEM.
APPLICATION FILED APR. 7, 1922.

1,426,643.

Patented Aug. 22, 1922.
2 SHEETS—SHEET 1.

Inventor
Theodore A. Holmberg
By
Ord E. Pillman
Attorney

T. A. HOLMBERG.
HEATING SYSTEM.
APPLICATION FILED APR. 7, 1922.
1,426,643.
Patented Aug. 22, 1922.
2 SHEETS—SHEET 2.
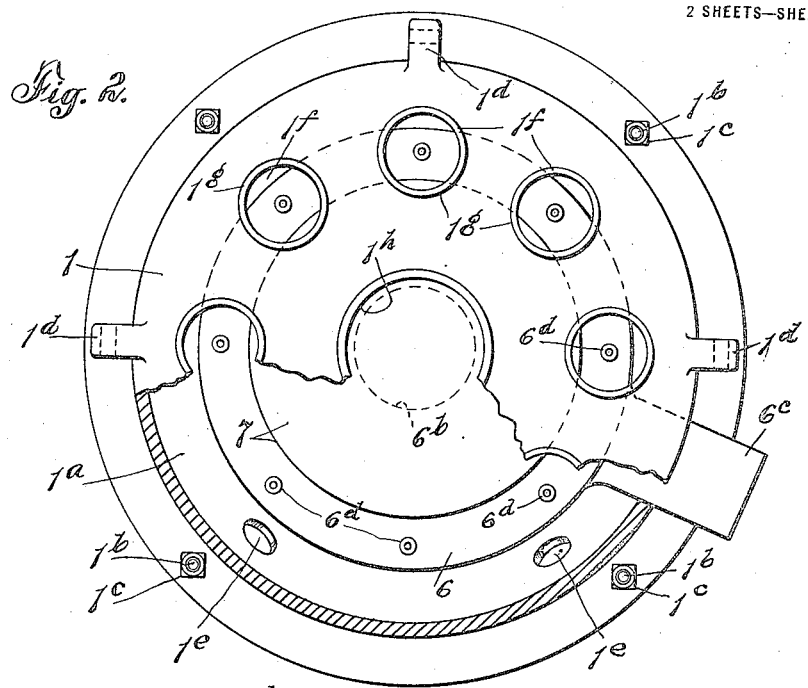
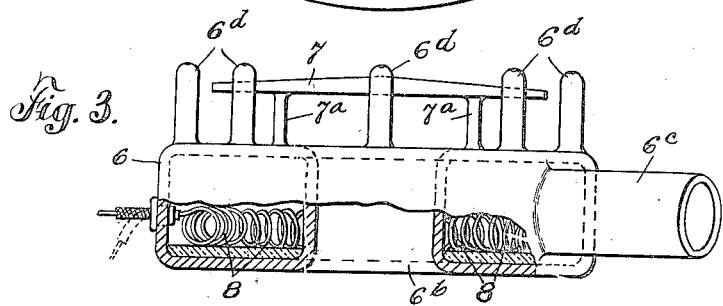
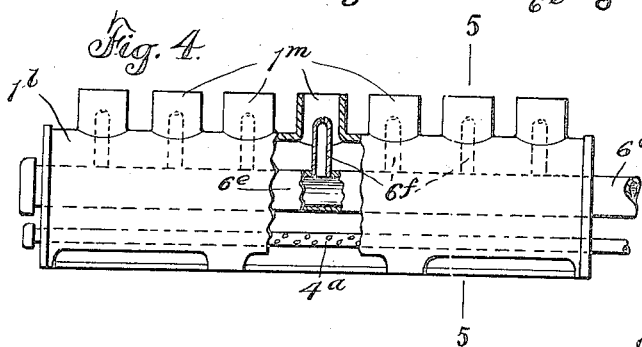
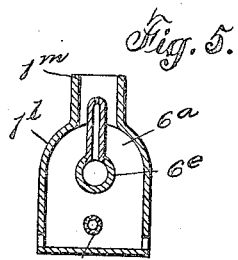
Inventor
Theodore A. Holmberg
By
Obed C. Billman
Attorney

UNITED STATES PATENT OFFICE.

THEODORE A. HOLMBERG, OF STAMFORD, CONNECTICUT.

HEATING SYSTEM.

1,426,643.

Specification of Letters Patent. Patented Aug. 22, 1922.

Application filed April 7, 1922. Serial No. 550,292.

*To all whom it may concern:*

Be it known that I, THEODORE A. HOLM-BERG, a citizen of the United States, residing at Stamford, in the county of Fairfield and State of Connecticut, have invented certain new and useful Improvements in Heating Systems, of which the following is a specification.

My invention relates to improvements in heating systems, and more particularly to that type or class in which the hot air is positively circulated or forced from the source of heat or combustion chamber into the heat distributing pipes or laterals through the medium of suitable air pressure pipes or nozzles communicating with a suitable air pressure chamber and a suitable fan or the like adapted to circulate the air into the chamber and through the nozzles into the heat distributing pipes or laterals.

The invention further relates to an improved flame enclosing generator casing provided with heat distributing pipes or laterals leading to the respective rooms or parts of the building structure to be heated together with an improved construction and arrangement of heat generating and air pressure circulating units, the air pressure unit adapted to provide a forced circulation of the hot air being preferably provided with air distributing laterals or nozzles arranged above the heat generating unit and being preferably arranged in alinement with and adapted to discharge hot air through the heat distributing pipes or laterals whereby the hot air (and products of combustion arising from the burner where a burner is used) is carried through said distributing pipes with the air discharged therein by said air discharging nozzles or laterals.

The invention further relates to the particular construction of the heat generating and air distributing units together with various cooperating features as will hereinafter more fully appear.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings, forming a part of this specification, Figure 1 is a side elevation of a heating system constructed in accordance with this invention, the heat generator casing and burner and air pressure distributing heads, being shown partly in central vertical section for the purpose of clearer illustration of the parts.

Fig. 2, a top plan view, partly in horizontal section, of the flame enclosing generator casing detached.

Fig. 3, a side elevation, partly in section, of the air pressure distributing head detached and equipped with an electric heating element in the specific form of resistance coils.

Fig. 4, a side elevation of an elongated form of flame enclosing generator casing and heat generator and air pressure distributing head constructed in accordance with this invention.

Fig. 5, a cross sectional view taken on line 5—5 of Fig. 4.

Similar numerals of reference designate like parts throughout all the figures of the drawings.

The improved apparatus carrying my improved heating system into effect comprises a suitable generator or flame enclosing casing 1, which may be of any suitable and convenient form, as for example,—of round or circular form, as shown in Fig. 1, and comprising a main casing 1, and a removable bottom section $1^a$, the sections 1 and $1^a$ being preferably provided with flanges adapted to be detachably connected together by means of bolts $1^b$ and nuts $1^c$.

As a convenient means of suspending the flame enclosing casing 1 from the first floor 2, of the building to be heated, suitable hanger rods 3, may be provided, said hanger rods 3 being connected to suitable parts of the building and connected to lugs $1^d$, of the main casing section 1.

As a means of supporting combustion within the generating casing 1 where a gas burner 4, is provided, the bottom section $1^a$ is provided with suitable air inlet openings $1^e$, and as a means of properly distributing the hot air or products of combustion from the generator casing 1, the latter is preferably provided with heat discharge ports $1^f$, suitably arranged and of a suitable number, to meet the number of rooms to be heated, said heat discharging ports $1^f$ being preferably formed by means of stub pipes $1^g$, adapted to be connected to a suitable number of heat distributing pipes or laterals 5, the latter being adapted to lead to suitable register casings or boxes $5^a$, provided with suitable floor or wall registers as may be required.

As a means of further promoting combustion (where a gas burner is used) and particularly as a means of accelerating and promoting the passage or circulation of hot air through the heat distributing ports 1$^f$ and pipes 5, an air pressure distributing head 6, is mounted above the heat generator or burner, said distributing head 6 being preferably of annular form, as shown, to provide an annular air pressure chamber 6$^a$, and having a central opening 6$^b$, for the escape of heat, and the waste products of combustion from the subjacent burner pass upwardly into the flue openings 1$^h$, of the casing and thence upwardly into the flue 1$^i$. The air pressure distributing head 6 is provided with a suitable air conduit pipe 6$^c$, leading to a suitable source of air pressure as for example, a fan or the like, operated by means of a suitable motor (not shown), said air conduit pipe being preferably supplied with air from the exterior of the building to be heated.

The air distributing head 6 may be mounted on lugs 1$^k$, extending inwardly from the main casing 1 and such head 6 is preferably provided with a baffle plate 7, mounted on suitable supporting member 7$^a$, said baffle plate being preferably of disc shape, as shown, and being adapted to divert the heat and products of combustion outwardly toward the air distributing pipes or nozzles 6$^d$, of the head 6. The air distributing laterals or nozzles 6$^d$ are preferably arranged in vertical central alinement with the heat discharge ports 1$^f$ (see Fig. 2) and are adapted to discharge air separately through the heat discharge ports and into the lateral heat distributing pipes 5 whereby the heat arising from the heat source is carried through said lateral pipes with the air discharged therein by said air distributing pipes or nozzles 6$^d$ communicating with the air pressure chamber 6$^a$ of the head 6.

If desired, an electric heating element such for example as suitable electric resistance coils 8, may be mounted directly within the air pressure distributing head 6, as shown in Fig. 3 of the drawings, and a similar arrangement may be provided for use in the lower portion of the generator casing in lieu of the gas burner 4.

If desired the generator or flame enclosing casing 1 may be of elongated form as at 1$^l$, as shown in Figs. 4 and 5 of the drawings, in which instance the gas burner may be in the specific form of a pipe burner 4$^a$, and the air pressure distributing head may be in the specific form of a distributor pipe 6$^e$, provided with nozzles or laterals 6$^f$, arranged in longitudinal alinement and arranged in corresponding alined and arranged heat discharging laterals or pipes 1$^m$.

As a means of lighting the gas burner 4, a separate nozzle 9 may be provided, said nozzle communicating with a small gas pipe 10, and being provided with a valve 9$^a$, the nozzle 9 being adapted when lighted to direct a gas jet into the opening 1$^n$, in the casing and which nozzle 9 may also be used if desired as a pilot light.

Having thus described one of the embodiments of my invention, without having attempted to set forth all the forms in which it may be made, or all the modes of its use, what I claim and desire to secure by Letters Patent is,—

1. In a heating system, a flame enclosing generator provided with heat distributing pipes and subjacent air inlet passages, an air pressure distributing head provided with nozzles adapted to discharge air into and through said heat distributing pipes, and a burner in said casing below said air distributing head whereby the said head is heated and the products of combustion are carried through said heat distributing pipes with the air discharged by said head and nozzles.

2. In a heating system, a flame enclosing generator casing provided at its top with heat distributing pipes, an air pressure discharge head in said casing provided with subjacent nozzles in alinement with and adapted to discharge air under pressure into and through said heat distributing pipes, a source of air pressure communicating with said air pressure discharge head, and a source of heat in said casing below said air pressure discharge head whereby the latter is heated and the generated heat carried through said heat distributing pipes with the air discharged therein by said nozzles of said head.

3. In a heating system, a flame enclosing generator casing provided at its top with lateral heat distributing pipes, an air pressure discharge head in said casing provided with subjacent nozzles in alinement with and adapted to discharge air under pressure into and through said heat distributing pipes, a source of air pressure for said discharge head, and a source of heat in said casing below said air pressure discharge head whereby the latter is heated and the generated heat carried through said heat distributing pipes with the air discharged therein by said air discharging nozzles.

4. In a heating system, a flame enclosing generator casing provided at its top with heat distributing pipes and open at its bottom, an air pressure distributing head in said casing provided with upwardly extending nozzles discharging air through said heat distributing pipes of said casing, a source of heat generation below said head with said generator casing, and means for supplying air under pressure to said air pressure distributing head whereby the heat arising from said heat generator is carried through said heat distributing pipes with the air discharged therein by said nozzles.

5. In a heating system, a flame enclosing generator casing provided at the top with lateral heat distributing pipes and in its bottom with air inlet passages, an air pressure distributing head provided with nozzles in alinement with and adapted to discharge air into and through the central portions of said heat distributing pipes, a burner in said casing below said air distributing head and nozzles whereby the said head and nozzles are heated and the products of combustion are carried through said heat distributing pipes with the air discharged therein by said nozzles, and means for supplying air to said head under pressure.

6. In a heating system, a flame enclosing generator casing open at its bottom and provided at its top with circularly arranged heat discharging ports, an air pressure distributing head of annular form providing an annular air pressure chamber therein and having upwardly extending nozzles adapted to discharge air under pressure into and through said heat discharging ports, a burner in said casing below said head whereby the latter and said nozzles are heated and the products of combustion are carried through said heat discharging ports with the air discharged therein by said nozzles, said casing being provided with a central flue opening for the waste products of combustion, and a baffle plate in said casing above said head and below said flue.

7. In a heating system, a flame enclosing casing having openings in its bottom and provided at its top with circularly arranged heat discharging ports, an annular air pressure distributing head provided with an annular air pressure chamber and having nozzles adapted to discharge air under pressure into and through said heat discharging ports, a burner in said casing in proximity to said head whereby the latter said nozzles are heated and the products of combustion are carried through said heat discharging ports with the air discharged therein by said nozzles, said casing being also provided with a central flue opening for the waste products of combustion, and a baffle plate above the central portion of said head and below said flue adapted to divert the heat products of combustion into said heat discharging ports.

In testimony whereof I have affixed my signature.

THEODORE A. HOLMBERG.